US007809587B2

United States Patent
Dorai et al.

(10) Patent No.: US 7,809,587 B2
(45) Date of Patent: Oct. 5, 2010

(54) RAPID BUSINESS SUPPORT OF INSURED PROPERTY USING IMAGE ANALYSIS

(75) Inventors: Chitra Dorai, Chappaqua, NY (US); William F. Jerome, Baldwin Place, NY (US); Edith H. Stern, Yorktown Heights, NY (US); Fred S. Winegust, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 1423 days.

(21) Appl. No.: 10/841,783

(22) Filed: May 7, 2004

(65) Prior Publication Data

US 2005/0251427 A1    Nov. 10, 2005

(51) Int. Cl.
*G06Q 40/00* (2006.01)
*G06G 7/48* (2006.01)
(52) U.S. Cl. .................................. 705/4; 703/6; 703/8
(58) Field of Classification Search .................. None
See application file for complete search history.

(56) References Cited

U.S. PATENT DOCUMENTS 5,128,859 A * 7/1992 Carbone et al. ............... 705/4
6,272,472 B1 * 8/2001 Danneels et al. ............ 705/27
2003/0200123 A1 * 10/2003 Burge et al. .................. 705/4

OTHER PUBLICATIONS

Chiroiu et al., "Damage Assessment Using High Resolution Satellite Imagery: Application to 2001 Bruj, India, Earthquake" 2001 RiskWorld.*
Sapiro et al., "Autobody Repair Technology", 2003, Cengage Learning, p. 283.*
Gregorovich, V.B., et al., SME Technical Paper FC, FC93-395, pp. 1-12, Elsevier Engineering Information, Inc., (1993).

* cited by examiner

*Primary Examiner*—Robert W Morgan
*Assistant Examiner*—Eliza Squires
(74) *Attorney, Agent, or Firm*—Novak Druce + Quigg

(57) ABSTRACT

A method of providing rapid business support of insured property using image analysis can include the step of receiving at least one digital image of damaged property. Damage can be automatically accessed for insurance purposes based upon the received images. An incident response can be automatically determined based at least in part upon the damage assessment. Incident responses can include, but are not limited to, tendering a claim payoff offer, referring a claim to a human agent, providing repair instructions, and/or arranging for a physical damage assessment of the damaged property.

17 Claims, 2 Drawing Sheets

RAPID BUSINESS SUPPORT OF INSURED PROPERTY USING IMAGE ANALYSIS

BACKGROUND

1. Field of the Invention

The present invention relates to the field of computer software and, more particularly, to an insurance damage assessment system that provides automated responses based upon image analysis techniques.

2. Description of the Related Art

The insurance industry performs assessments of damage claims in a labor intensive and inefficient manner. Normally, an insured individual must report a claim to an insurance company. Depending on the damage, the insurance company may assign an adjustor or repair shop to physically inspect the damaged property and estimate repair costs. During the physical inspection, the damage assessor records damage metrics, photographs the damaged property, and estimates a repair cost, which will result in a claims payment based upon his or her evaluation.

Depending on workload volume, it can take a substantial amount of time before a damage assessor can be assigned to handle a given claim, or the insured can take the damaged item to an approved repair shop for a preliminary assessment. This can be especially true when the adjustor has to travel significant distances to inspect damaged property. This time delay can be extremely aggravating to the insured, who often is suffering a hardship while an insurance claim is pending. Further, the time delay can be costly to the insurance company in situations where the insurance company is required to provide temporary relief for the insured. For example, an automobile insurance company may be required to pay for a car rental until an automobile is repaired. Similarly, a home insurance company may be required to providing temporary living conditions until a home is repaired.

Occasionally, repair agents in approved repair shops are used in lieu of adjustors, most likely in car damage situations. In these cases, the repair agents are authorized to assess the damage for the insurance company. Here, an insurance company relies upon trust and contractual relationships with a repair agent for a proper damage assessment. This practice, however, can limit the number of repair agents that are authorized by the insurance agency, often frustrating insured individuals who may find it difficult to bring the damaged item in for assessment. Further, insurance companies utilizing this practice can be easily overcharged for repairs, can be subject to excessive repairs, and/or repairs can be made in an inferior fashion.

SUMMARY OF THE INVENTION

The present invention provides a method, a system, and an apparatus for assessing damage for insurance purposes based upon digital images in accordance with an embodiment of the inventive arrangements disclosed herein. In one embodiment, the present invention can integrate image analysis techniques into the business practices of the insurance industry, thereby providing real-time decision support for the claims process. In another embodiment, the present invention can be used to increase the number of cases that each insurance adjustor can handle by automatically handling routine, low-dollar cases and by eliminating the need for skilled adjustors to physically inspect insured property. In still another embodiment, the present invention can speed up the claims process, thereby increasing customer satisfaction levels.

One aspect of the present invention can include a method of providing rapid business support of insured property. According to the method, digital images of damaged property can be conveyed to a networked location containing an image analyzer. The image analyzer can evaluate if the received images are sufficient to perform a damage assessment. If not, a message can be automatically relayed to an image providing source requesting supplemental images. This message can optionally contain at least one suggestion for improving image quality so that the damage assessment can be performed. After receiving sufficient images, the image analyzer can determine at least one incident response.

Another aspect of the present invention can include a system for insuring property using image analysis that includes an image analysis engine and an incident response engine. The image analysis engine can assess damage for insurance purposes by comparing at least one digital image of damaged property against at least one digital image of undamaged property. The incident response engine can automatically issue an incident response based at least in part upon a damage assessment of the image analysis engine.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
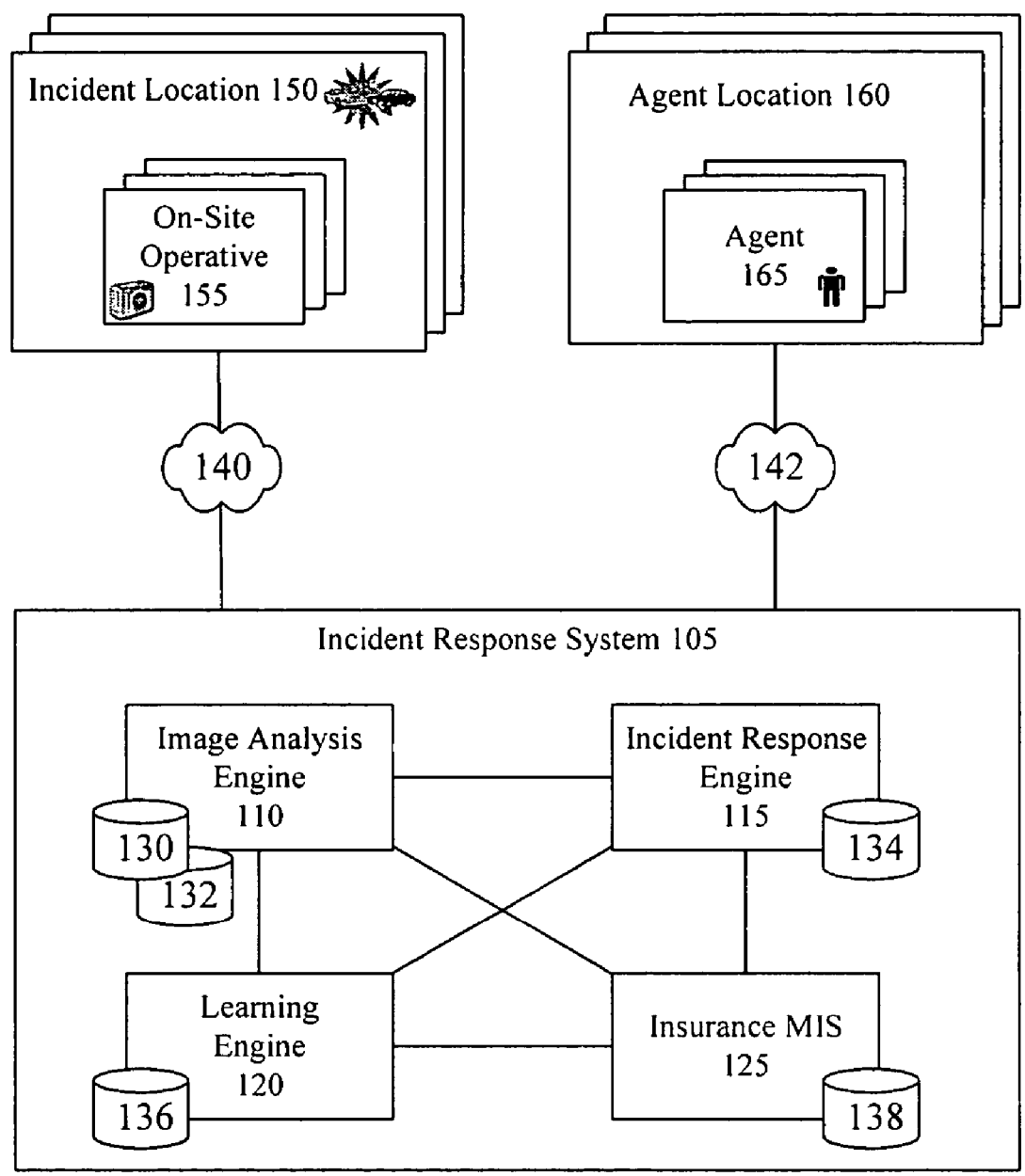
FIG. 1 is a schematic diagram illustrating a system in which digital image analysis can be used in conjunction with an insurance claim in accordance with an embodiment of the inventive arrangements disclosed herein.

FIG. 1 is a schematic diagram illustrating a system 100 in which digital image analysis can be used in conjunction with an insurance claim in accordance with an embodiment of the inventive arrangements disclosed herein. The system can include an incident response system 105 that receives at least one digital image of damaged property, analyzes the image, and responsively executes at least one automated programmatic action. The programmatic action can include, but is not limited to, tendering a claim payoff, referring a claim to a human agent, providing repair instructions, arranging for physical damage assessment, requesting further digital images of the damaged property, automatically filling out database fields pertaining to the incident, and other claim related actions.

The incident response system 105 can include an image analysis engine 110, an incident response engine 115, a learning engine 120, and/or an insurance management information system (MIS) 125. The insurance MIS 125 can be a system utilized by one or more insurance companies to manage insurance operations, record policy-specific data, and the like. Insurance MIS 125 data can be stored within data store 138, which can be utilized by the image analysis engine 110, the incident response engine 115, the learning engine 120, and/or other authorized sources.

The image analysis engine 110 can assess damage for insurance purposes by comparing at least one digital image of damaged property against at least one digital image of undamaged property. The image analysis engine 110 can compare one damaged property image against one undamaged property image, can compare one damaged property image against multiple undamaged property images, can compare multiple damaged property images to one undamaged property image, and/or can compare multiple damaged property images to multiple undamaged property images. Further, multiple sequenced images, such as a sequence of images forming a video clip, can be analyzed by the image analysis engine 110.

Images of damaged property can be stored in data store 130 and undamaged property images can be stored in data store 132. The undamaged images include computer-constructed images as well as images retrieved from an image repository. In one embodiment, the undamaged images can be images taken of the damaged property when the property was in an undamaged state. For example, part of the policy enrollment process can require an insured individual to provide one or more digital images of the property to be insured. In systems in use today, such images are captured and stored for later manual inspection.

In one arrangement, the image analysis engine 110 can be used to classify large areas of damage and an overall assessment can be based upon these large areas. For example, when comparing two automobiles an overall damage assessment can be conducted by the image analysis engine 110 indicating damage to a vehicle's front, rear, driver's side, and/or passenger's side. In another arrangement, the image analysis engine 110 can be used to assess discrete components that have sustained damage, such as damage to a front bumper, headlight, tires, and the like. Further, the image analysis engine 110 can assess a damage level to each component, such as cosmetic, light, moderate, heavy, and totaled. Data sources listing estimated component repair and/or replacement costs can be accessed by the image analysis engine 110 to determine an overall damage estimate.

Moreover, the image analysis engine 110 can determine different damage types. For example, when assessing household damage, damage types may include such types as flood, fire, and vandalism. The image analysis engine 110 can also assign a damage level to the damaged property. For example, damage levels can include negligible, slight, moderate, severe, totaled, and the like. An overall damage amount can be estimated based upon the damage level, damage type, property type, estimated property value, and/or other factors. To determine damaged property specifics and/or other policy-specific information, the image analysis engine can access the insurance MIS 125 or any other data source.

Additionally, the image analysis engine 110 can record data that is discerned during analysis into suitable data fields relating to the damaged property and/or the insurance claim. For example, data fields in the insurance MIS 125 can be automatically populated by the image analysis engine 110, thereby saving agents 165 of the insurance company time over manual data entry. If agents 165 are required by policy or workflow to provide manual data entry, data fields populated by image analysis engine 110 may be used as part of a validation process, an audit process, or as pre-populated entries for the review of agents 165.

In one embodiment, the image analysis engine 110 can evaluate received images to determine if these images are useful for analysis purposes. For example, the image analysis engine 110 can determine if the brightness, contrast, focus, field of view, resolution, quantity, and the like of the images are appropriate. If not, the image analysis engine 110 can request an image providing source, such as an on-site operative 155, to provide additional images. Further, the image analysis engine 110 can provide one or more suggestions to the image providing source for improving the perceived deficiencies of the received images.

In one embodiment, such interactions can occur in real time between the incident response system 105 and on-site operatives 155 located at the incident location 150, where the incident location can be a location where the damaged property resides. In such an embodiment, the on-site operative 155 can generate images of the damaged property using an image-capturing device, such as a digital camera, a mobile telephone with picture capture capabilities, a mobile computing device with a video capturing peripheral, an in-vehicle image capturing device, and the like. The images can be conveyed across a network 140, through a wireless conveyance means or a landline, to the incident response system 105. Feedback for image correction can be especially beneficial, when the on-site operative 155 is a convenient, but not necessarily skilled agent of the insurance company.

For example, the on-site operative 155 can be a tow-truck driver, a police photographer, an insured individual, and the like. Feedback may be provided to onsite operative 155 through the same device used to capture the image, e.g. a mobile telephone with picture capture capabilities and short messaging (SMS) capabilities, or it may be provided through a separate device associated with on-site operative 155, equipped to receive such indications.

The incident response engine 115 can automatically issue an incident response responsive to an analysis conducted by the image analysis engine 110. Responses of the incident response engine 115 can be based upon previously established policies recorded within a policy store 134. The policies in the policy store 134 can be deterministic or heuristically enacted. In one embodiment, the incident response engine 115 can be implemented as a finite state machine that responds to established events in a state-dependent fashion. The incident response engine 115, however, is not limited to any particular implementation and usage of any known computing technique is contemplated as a means of implementing the incident response engine 115.

The incident response engine 115 can generate a single response or multiple responses. Multiple responses can be executed in accordance with one or more workflows established within the policy store 134. Particular ones of the incident responses can be automatically executed without agent 165 interactions. For example, automated incident responses can include tendering a claim payoff (when the payoff is under a predetermined threshold), providing repair instructions, automatically mailing or e-mailing claim instructions to a policy holder, scheduling repair times, and the like.

Other incident responses can require agent 165 interactions, where the agent 165 can include any human in the employ of the insurance agency. The agent 165 can include, but is not limited to, a claim adjustor, a service person, a customer service representative, a supervisor, and the like. Further, the agent 165 can reside at any agent location 160 that is communicatively linked to the incident response system 105 via network 142. The communication link can be a direct link to the agent 165, such as a telephone link, or can occur through an intermediary computing system, such as a management information system local to the agent location 160. Incident responses that require agent 165 interactions can include, but are not limited to, arranging for physical damage assessments, approving a computer suggested payoff amount (when the payoff is over a predetermined threshold), approving automatically generated data elements to be stored within the insurance MIS 125, and the like.

In one embodiment, the incident responses issued by the incident response engine 115 can be dependant upon insurance-centric data contained within the insurance MIS 125. For example, the incident response can depend upon a history of the damaged property, an insurance history of a customer relating to the damaged property, the insurance policy, policy-type, insured object type, and other insurance-centric information. The incident response generated by the incident response engine 115 can also be dependant upon agent 165 availability, assessed damage level, estimated claim payoff amount, damage type, damage extent, and the like.

The learning engine 120 can be associated with a training data store 136. The training data store 136 can include model images for damaged property and/or undamaged property and associated model damage assessment results. This training data can test the accuracy of the image analysis engine 110. When the image analysis engine 110 is implemented in a trainable fashion, the learning engine 120 can use the training data to initialize the image analysis engine 110. For example, the image analysis engine 110 can be a neural network consisting of a multitude of weights that can be adjusted through training techniques. Moreover, the learning engine 120 can use real data contained within the insurance MIS 125 to responsively adjust parameters of the image analysis engine 110. Similarly, the learning engine 120 can train and/or adjust settings of the incident response engine 115 to achieve desired results, as defined by model or real data.

It should be appreciated that the arrangements shown in FIG. 1 are for illustrative purposes only and that the invention is not limited in this regard. The functionality attributable to the various components can be combined or separated in different manners than those illustrated herein. For instance, the incident response engine 115 and the insurance MIS 125 can be implemented as a single software component in another arrangement of the present invention.

It should be noted that data stores 130, 132, 134, 136, and 138 can store information in any recording medium, such as a magnetic disk, an optical disk, a semiconductor memory, and the like. Further, each of the data stores 130, 132, 134, 136, and 138 can utilize any information retention technique including a file-based storage technique or a database storage technique. Moreover, each of the data stores 130, 132, 134, 136, and 138 can be a storage area fixed to a geographical location or a storage area distributed across a network space.

It should also be noted that the image analysis engine 110 can perform any of a variety of image processing tasks when comparing the digital images. That is, image enhancement techniques, image translation techniques, image alignment techniques, image reconstruction techniques, image equalization and normalization techniques, and the like can be conducted by the image analysis engine 110.

Additionally, the image analysis engine 110 can utilize any variety of pattern matching techniques when comparing the damaged property images with undamaged property images. In one embodiment, the image analysis engine 110 can utilize an area based matching (ABM) and/or a feature based matching (FBM) technique. In another embodiment, the image analysis engine 110 can map image primitives using a sensor model and/or an object surface model.

Figure 2:
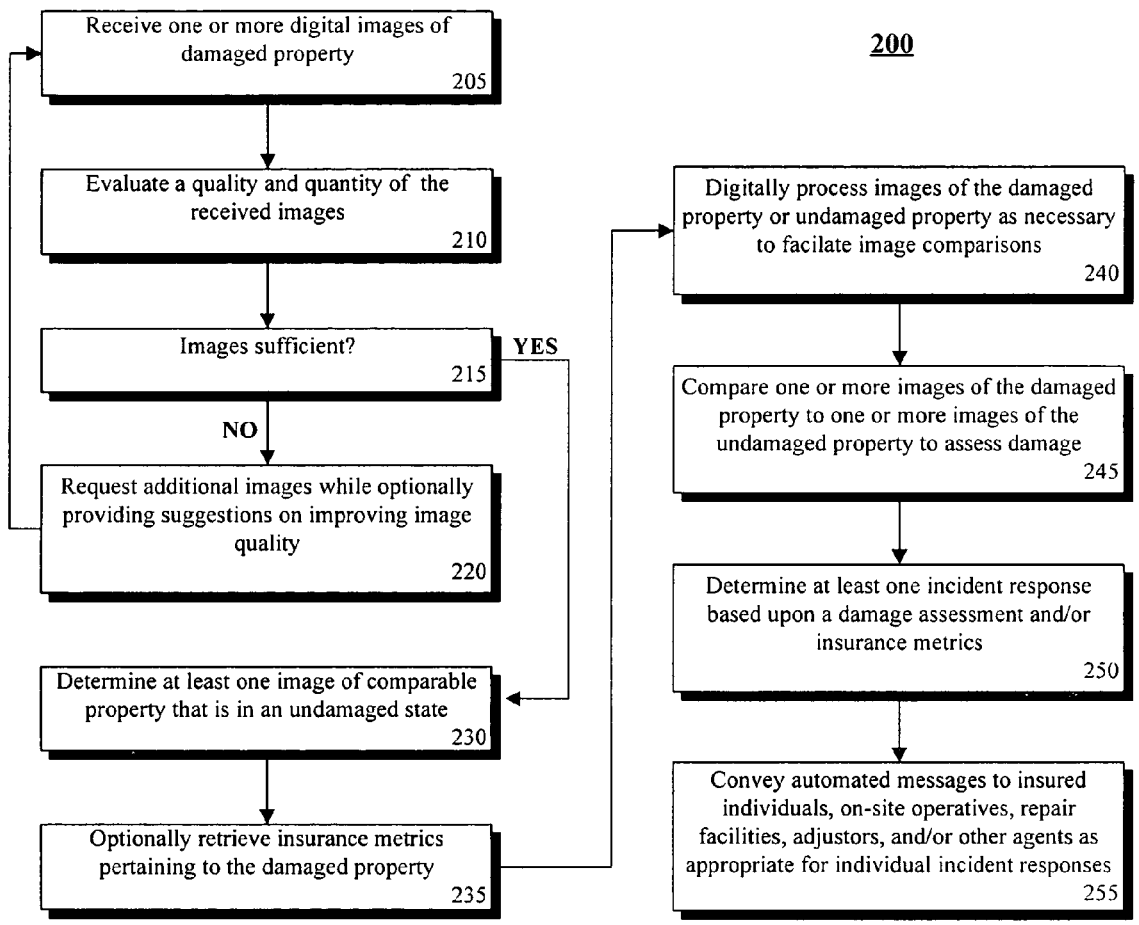
FIG. 2 is a flowchart illustrating a method for providing rapid business support of insured property using image analysis in accordance with an embodiment of the inventive arrangements disclosed herein.

FIG. 2 is a flowchart illustrating a method 200 for providing rapid business support of insured property using image analysis in accordance with an embodiment of the inventive arrangements disclosed herein. In one embodiment, the method 200 can be performed in the context of an incident response system 105 of FIG. 1. The method 200 can begin in step 205, where one or more digital images of damaged property can be received.

In one embodiment, the digital pictures can be taken by on-site personnel. For instance, an authorized tow-truck driver can take digital pictures of an automobile accident at the scene of the accident. In such an embodiment, the pictures can be wirelessly conveyed to an insurance response system or can be conveyed using a landline communication means. The invention is not limited in this regard, however, and the pictures can be received through any source. For example, a homeowner, a repair technician, and/or other picture providing source can be used to take and subsequently convey pictures of the damaged property to the insurance response system. In another embodiment, the damaged property may be taken to a dedicated image capture facility.

In step 210, the quality and quantity of the received images can be evaluated. For example, image resolution, contrast, focus, coverage, and the like can be evaluated. In step 215, a determination can be made as to whether the received images are sufficient to perform damage analysis. If not sufficient, the method can proceed to step 220, where a request for additional images can be made. The request can optionally provide one or more suggestions or instructions on improving image quality. These suggestions can be especially helpful when an image-providing source is an inexperienced agent and/or an automated image gathering computing device. The method can then loop to step 205 where additional images of the damaged property can be received. The determination of image sufficiency may be based on preset parameters for brightness, focus and the like, or may be based on a history of sufficiency of previous similar images.

If in step 215, the images are sufficient, the method can proceed to step 230, where at least one image of undamaged property that is comparable to the damaged property can be determined. In one embodiment, the undamaged images can include images of the damaged property acquired before damage occurred. In another embodiment, the undamaged images can be model images of similar property that have been retrieved from an image repository and/or generated by a computer. Repositories may reside within the same administrative domain (e.g. within the insurance company systems) or may be remotely operated, for example, as a service on behalf of the industry.

In step 235, insurance metrics pertaining to the damaged property can be optionally retrieved. In one embodiment, these insurance metrics can be used to adjust incident responses. For instance, incident responses can be adjusted based upon a history of the damaged property, a customer insurance history, and other policy-specific information. Further, incident responses may also take into account dynamic data, such as current adjuster workload. For example, if all adjusters are expected to be busy for an extended period, the threshold at which an adjuster is required to intervene may be raised on a temporary basis to ameliorate the workload burden.

For example, if an insurance policy limits damage to a fixed amount, such as $10,000, and if insured damage is estimated over a designated amount, such as $20,000, then an automatic settlement offer up to the policy limit can be tendered without agent assistance.

In another example, if an insurance policy requires a significant deductible compared to estimated damage automatically determined, a letter can be automatically sent to the insured that states the insurance company does not believe that the damage exceeds the deductible. The letter can provide an agent contact number and a case number in the event that the insured disagrees with the automated estimated and wishes to have an agent re-assess the damage. The invention is not limited in this regard, however, and any programmable responses can result from policy-specific data.

In step 240, images of the damaged or undamaged property can be digitally processed as necessary to facilitate image comparisons. In step 245, one or more images of the damaged property can be compared to one or more images of the undamaged property to assess damage. Such pre-processing in step 240 may include, but is not limited to, scaling, contrast adjustment, position normalization, and the like so that the damaged property and the undamaged property appear in standardized sizes at standard x and y coordinates in their respective images at comparable brightness levels.

Step 245, for example, can involve comparing the region circumscribing the property in the undamaged property image with the region in the damaged property region. In one embodiment, differences or variances in the pixel color values or brightness values between images can be used to indicate a damage region or regions. The location coordinates of the image variances can be used to characterize damage as occurring in a property area, such as front, rear, and the like. The differences in the images can also be used to determine which part or parts of the insured property within the indicated damage region require replacement and/or repair. Moreover, the quantitative extent of the differences in the images can be used to characterize the severity of the damage occurring within damage regions and/or the severity of damage to individual parts of the insured property.

In step 250, at least one incident response can be determined based upon the damage assessment. As previously mentioned, this damage assessment can be additionally dependent upon one or more insurance metrics. Incident responses can include tendering a claim payoff offer, assigning a human agent to handle the claim, scheduling a repair action, scheduling a physical inspection of the damaged property, and the like. In step 255, automated messages can be conveyed to the insured individuals, one-site operatives, repair facilities, adjustors, and/or other agents as appropriate for the incident responses determined in step 250.

The present invention can be realized in hardware, software, or a combination of hardware and software. The present invention can be realized in, a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of assessing damage of an insured property using image analysis for processing an insurance claim and generating an automated incident response message within an incident response system comprising the steps of:

receiving at least one digital image of the insured property in a damaged state in the incident response system from at least one remote image taking device;

evaluating a quality and quantity of the received at least one digital image of the insured property in the damaged state and determining whether the at least one digital image of the insured property in the damaged state is sufficient to perform damage analysis;

if the at least one digital image of the insured property in the damaged state is not sufficient to perform damage analysis, requesting at least one additional image;

if the at least one digital image or the at least one additional image of the insured property in the damaged state is sufficient to perform damage analysis, obtaining at least one image of the insured property in an undamaged state before the damage occurred or at least one image of a model property comparable to the insured property in an undamaged state before the damage occurred;

retrieving insurance metrics pertaining to the damaged property, wherein the insurance metrics include policy-specific data for a policy relating to the damaged property;

digitally processing the images of the insured property in the damaged state and in the undamaged state to facilitate a comparison of the at least one image of the insured property in the damaged state and the at least one image of the insured property in the undamaged state, wherein the processing is performed by a processor of the incident response system;

assessing damage based upon the comparison, wherein assessing damage includes determining a damage area or type, assigning a damage level, and estimating an overall damage cost based upon factors including the damage area or type, the damage level, and data relating to repair and/or replacement costs, wherein the assessing is performed by the processor;

determining an incident response to the insurance claim based at least in part upon the assessing step and utilizing the retrieved insurance metrics pertaining to the damaged property, wherein the determining is performed by the processor; and generating an automated incident response message based on the determined incident response and conveying the message to appropriate parties relating to the insurance claim.

2. The method of claim 1, wherein the incident response includes at least one of tendering a claim payoff offer, referring a claim to a human agent, providing repair instructions, and arranging for a physical damage assessment of the damaged property.

3. The method of claim 1, wherein the insurance metrics further include at least one of a history of the damaged property and an insurance history of a customer relating to the damaged property.

4. The method of claim 1, wherein the incident response is adjusted based upon at least one of an insurance agent availability, a workload level, and an assessed damage level.

5. The method of claim 1, said processing step further comprising the step of:
digitally processing the at least one image of the insured property in the damaged state and the at least one image of the insured property in the undamaged state to generate normalized images; and
utilizing said normalized images for the comparison.

6. The method of claim 1, wherein the at least one digital image of the insured property in the damaged state is transmitted by an image providing source via a first device, and wherein a message requesting that the image providing source provide additional images is transmitted to a second device associated with the image providing source, wherein the second device is different from the first device.

7. The method of claim 6, further comprising the step of:
providing to the image providing source at least one suggestion for improving image quality.

8. The method of claim 1, further comprising the step of:
automatically populating at least one database field relating to an incident in which the insured property was damaged by analyzing the received at least one digital image of the insured property in the damaged state.

9. The method of claim 1, wherein said assessing step assigns a monetary amount to the assessed damage, and wherein the determined incident response is dependent upon the assigned monetary amount.

10. The method of claim 1, wherein said method is performed within a networked software application configured to execute on the processor and accessed by authorized agents of an insurance company, wherein the received digital images are taken at an accident site using a mobile computing device that is wirelessly linked to the networked software application.

11. The method of claim 1, wherein the at least one image of the model property is received from a remotely located source that provided the at least one image of insured property.

12. The method of claim 1, wherein the image of the insured property in the damaged state is taken at a scene of an accident, and wherein a result of said assessing step is conveyed in real-time to the scene of the accident, and wherein said assessing step occurs within a computing device located remotely from the scene of the accident.

13. A non-transitory machine-readable storage having stored thereon, a computer program having a plurality of code sections, said code sections executable by a machine for causing the machine to perform the steps of:
receiving at least one digital image of an insured property in a damaged state in an incident response system from at least one remote image taking device;
evaluating a quality and quantity of the received at least one digital image of the insured property in the damaged state and determining whether the at least one digital image of the insured property in the damaged state is sufficient to perform damage analysis;
if the at least one digital image of the insured property in the damaged state is not sufficient to perform damage analysis, requesting at least one additional image;
if the at least one digital image or the at least one additional image of the insured property in the damaged state is sufficient to perform damage analysis, obtaining at least one image of the insured property in an undamaged state before the damage occurred or at least one image of a model property comparable to the insured property in an undamaged state before the damage occurred;
retrieving insurance metrics pertaining to the damaged property, wherein the insurance metrics include policy-specific data for a policy relating to the damaged property;
digitally processing the images of the insured property in the damaged state and in the undamaged state to facilitate a comparison of the at least one image of the insured property in the damaged state and the at least one image of the insured property in the undamaged state;
assessing damage based upon the comparison, wherein assessing damage includes determining a damage area or type, assigning a damage level, and estimating an overall damage cost based upon factors including the damage area or type, the damage level, and data relating to repair and/or replacement costs;
determining an incident response to an insurance claim based at least in part upon the assessing step and utilizing the retrieved insurance metrics pertaining to the damaged property; and
generating an automated incident response message based on the determined incident response and conveying the message to appropriate parties relating to the insurance claim.

14. A computer-implemented incident response system for assessing damage of an insured property using image analysis for processing an insurance claim and generating an automated incident response message comprising:
at least one memory; and
at least one processor including:
an image analysis engine configured to
receive at least one digital image of the insured property in a damaged state in the incident response system from at least one remote image taking device;
evaluate a quality and quantity of the received at least one digital image of the insured property in the damaged state and determine whether the at least one digital image of the insured property in the damaged state is sufficient to perform damage analysis;
if the at least one digital image of the insured property in the damaged state is not sufficient to perform damage analysis, request at least one additional image;
if the at least one digital image or the at least one additional image of the insured property in the damaged state is sufficient to perform damage analysis, obtain at least one image of the insured property in an undamaged state before the damage occurred or at least one image of a model property comparable to the insured property in an undamaged state before the damage occurred;
digitally process the images of the insured property in the damaged state and in the undamaged state to facilitate a comparison of the at least one image of the insured property in the damaged state and the at least one image of the insured property in the undamaged state; and
assess damage based upon the comparison, wherein assessing damage includes determining a damage area or type, assigning a damage level, and estimating an overall damage cost based upon factors including the damage area or type, the damage level, and data relating to repair and/or replacement costs;

an incident response engine configured to
- retrieve insurance metrics pertaining to the damaged property, wherein the insurance metrics include policy-specific data for a policy relating to the damaged property;
- determine an incident response to the insurance claim including an appropriate action based at least in part upon the assessment and utilizing the retrieved insurance metrics pertaining to the damaged property; and
- generate an automated incident response message based on the determined incident response and conveying the message to appropriate parties relating to the insurance claim.

15. The system of claim 14, further comprising:

an insurance management information system containing insurance policy data, wherein said incident response engine accesses the insurance management system to determine insurance policy data relating to the damaged property, and wherein issued incident responses are partially based upon the accessed insurance policy data.

16. The system of claim 14, further comprising a learning engine for periodically training the image analysis engine and the incident response engine to improve an accuracy of the image analysis engine and the incident response engine.

17. The system of claim 16, further comprising:

- a persistent data store configured to store digital images of damaged and undamaged properties and data related to the damaged and undamaged properties; and
- wherein the learning engine is configured to analyze data contained within the persistent data store and responsively adjust behavior of at least one of the image analysis engine and incident response engine.

* * * * *